J. A. MARTIN.
GAS VALVE.
APPLICATION FILED APR. 30, 1918.
1,281,185.
Patented Oct. 8, 1918.
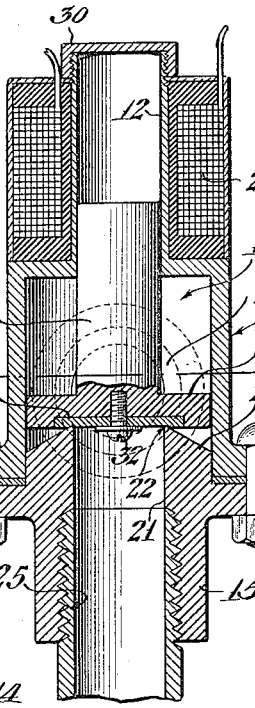
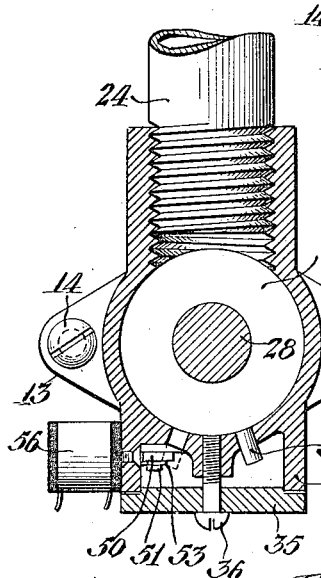
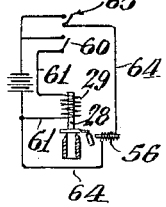
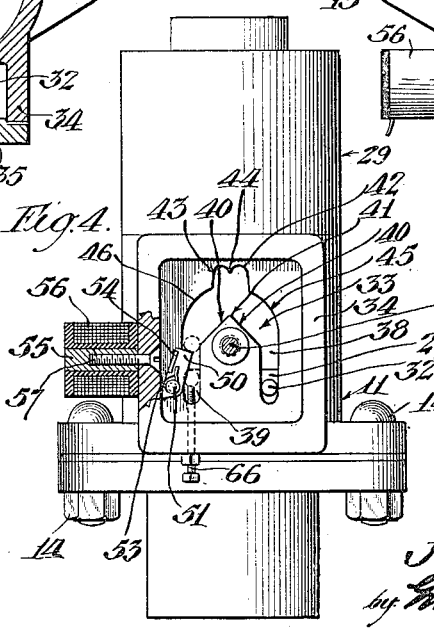
Inventor
Jesse A. Martin
by Graham & Harris
Attorneys.

UNITED STATES PATENT OFFICE.

JESSE A. MARTIN, OF LOS ANGELES, CALIFORNIA.

GAS-VALVE.

1,281,185.  Specification of Letters Patent.  Patented Oct. 8, 1918.

Application filed April 30, 1918.  Serial No. 231,966.

*To all whom it may concern:*

Be it known that I, JESSE A. MARTIN, a citizen of the United States, residing at Los Angeles, in the county of Los Angeles and State of California, have invented a new and useful Gas-Valve, of which the following is a specification.

My invention relates to gas valves, being more particularly an electrically controlled gas valve for use in controlling gas furnaces and the like. Gas furnaces are usually placed in the cellar or basement, and it is particularly desirable to regulate the furnace from the upper floors of the house, and the principal object of my invention is to produce a simple and efficient form of gas valve which may be controlled by an electric circuit.

Other objects and advantages will appear hereinafter from the following specification.

Referring to the drawings, which are for illustrative purposes only.

Figure 1 is a vertical sectional view of a valve embodying a form of my invention.

Fig. 2 is a sectional plan view on line 2—2 of the valve shown in Fig. 1.

Fig. 3 is a plan view of the valve shown in Fig. 1.

Fig. 4 is a side elevation partly in section of the valve shown in Fig. 1.

Fig. 5 is a diagrammatic view showing the electrical connections to the valve.

11 designates a valve body terminating at its upper end in a tubular extension 12 and at its lower end in ears 13 through which extend bolts 14 for securing to the valve body a base member 15. 16 designates packing between the body 11 and the member 15 to form a tight joint therebetween. 18 designates a valve chamber formed in the valve body into the lower end of which extends the upper end 20 of the member 15. The member 15 is provided with a central circular opening 21, the upper edge 22 of which forms a knife edge valve seat, the portion of the member 15 about said seat being beveled downwardly and outwardly therefrom as clearly shown in Fig. 1.

24 designates a gas inlet pipe through which gas is introduced to the valve chamber from any suitable gas supply under pressure, and 25 designates a pipe threaded into the lower end of the member 15, which pipe 25 connects the valve to the furnace (not shown) as will be readily understood. 27 designates a valve of the disk type provided with a stem 28 which slidably extends into the tubular extension 12, and constitutes the core of a solenoid winding or coil 29 arranged around the tubular extension and held firmly in place thereon by means of a cap 30 threaded onto the upper end of the extension 12. The stem 28 and valve 27 are made of iron and the valve 27 is provided with a leather disk 31 secured in the under face thereof by means of a suitable screw or bolt 32, the leather 31 being arranged to engage the valve seat 22. The body 11 and member 15 are preferably made of brass and the valve stem 28 which constitutes the core of the solenoid is made of soft iron.

32 designates a pin mounted in the side of the valve 27 and extending outwardly therefrom through a cam slot 33 formed in the side of the valve body 11, the valve body being provided with a hollow boss or box 34 formed on one side of the same provided with a suitable cover plate 35 secured to the valve body by means of a screw or bolt 36.

The cam slot 33 is provided with two vertically arranged legs 38 and 39, the inner faces of the respective slots being beveled as indicated at 40 and terminating in a switch point 41 which is substantially central between the two legs 38 and 39. Arranged directly over the switch point 41 are two pockets 42 and 43 separated by a fin 44. The outer face of the leg 38 terminates at its upper end in a curved portion 45 which is connected at its upper end with the pocket 42 and the outer face of the leg 39 is similarly connected with a curved portion 46 with the pocket 43 as clearly shown in Fig. 4 of the drawings.

50 designates a latch pivoted at 51 to the valve body 11 and arranged to extend into the path of the pin 32 when the same is in the leg 39 of the slot 33. 53 designates a spring arranged to elastically hold the latch in the path of the pin 32 and 54 designates an iron plate arranged in one face of the latch in position to be acted upon by the stationary core 55 of a winding 56, the core being directly connected through one wall of the boss 35 by means of an iron screw 57.

The valve is operated in the following manner:

Assuming that the valve is in the position shown in Fig. 1 and that the gas pressure is in the valve chamber 18 from the pipe 24, it will be understood that no gas is passing to the furnace. When it is desired to start the furnace, however, the switch, which may be of any desirable form indicated at 60, is closed thereby closing the circuit 61 and energizing the solenoid 29 which is of sufficient power to unseat the valve 27 against the gas pressure in the valve chamber 18, and as soon as the valve 27 leaves the seat the gas pressure being relieved through the pipe 25 the valve 27 jumps upwardly, the pin 32, shown in full lines in Fig. 4, traveling upwardly in the leg 38 of the cam slot 33. As the pin 32 reaches the upper end of the leg 33 it rides over the curved face 45 of the slot which directs the pin into the pocket 43, the pin 44 retaining the pin in the pocket 43 until the switch or button 60 is released, in which case the valve 27 drops and the pin 32 falls upon the beveled face 40 directly under the pocket 43 and moves outwardly thereover into the dotted line position shown in Fig. 4 where it rests upon the latch 50. This latch holds the valve in full open position.

If it is desired to shut off the valve the button or switch 60 is again momentarily closed, the solenoid is energized and the valve moves upwardly, the pin traveling over the curved face 46 of the cam slot which directs the pin into the pocket 42 due to the momentum of the upwardly moving core and valve. The release or opening of the button or switch 60 permits the valve to drop, the pin dropping from the pocket 42 onto the beveled face 40 directly thereunder, which guides the pin into the leg 38 permitting the valve to drop upon the seat 22 thereby closing the valve.

In the event, however, that the valve is in full open position and the pin in the dotted line position as shown in Fig. 4 and it is desired to partially close the valve and not use a full amount of gas in the furnace the circuit 64 is closed by means of a switch or button 65, the coil 56 is energized, and acting through the core 55 and screw 57, the latch is pulled toward the core and the pin 32 permitted to drop into the leg 39 of the slot 33, in a position shown in dot and dash lines in Fig. 4 where it rests upon the upper end of a threaded bolt 66 supported in the box 34 and by means of which the opening of the valve may be regulated.

It is understood that when it is desired to shut off the gas when the valve is in the position indicated by the pin in dot and dash lines in Fig. 4, that the button or switch 60 is closed and the pin moves upwardly in the leg 39 of the slot 33 over the curved face 46 thereof as heretofore described.

What I claim is:

1. A gas valve comprising a valve body, a valve seat therein, a valve member in said body arranged to engage said seat, a coil, a core for said coil mounted on the valve member, and means on said valve member and valve body for varying the relation between said valve member and said valve seat, said means consisting of a pin on said valve member arranged to engage a cam slot formed in the valve body, said cam slot having two vertically arranged legs, a pocket above each leg, a fin between said pockets, and a switch point below said pockets arranged to guide the pin into the leg under the respective pockets.

2. A gas valve comprising a valve body, a valve seat therein, a valve member in said body arranged to engage said seat, a coil, a core for said coil mounted on the valve member, means on said valve member and valve body for varying the relation between said valve member and said valve seat, said means consisting of a pin on said valve member arranged to engage a cam slot formed in the valve body, a movable latch in the path of said pin, and means for operating said latch.

3. A gas valve comprising a valve body, a valve seat therein, a valve member in said body arranged to engage said seat, a coil, a core for said coil mounted on the valve member, means on said valve member and valve body for varying the relation between said valve member and said valve seat, said means consisting of a pin on said valve member arranged to engage a cam slot formed in the valve body, a movable latch in the path of said pin, elastic means for holding the latch in the path of said pin, and means for moving said latch out of the path of the pin.

4. A gas valve comprising a valve body, a valve seat formed therein, a valve member arranged in the valve body to engage said seat, a coil on said valve body, a stem on said valve member forming a core for said coil, and a pin on said valve member extending into a cam slot formed in said valve body, said cam slot having two vertically arranged legs, a pocket above each leg, a fin between said pockets and a switch point below said pockets arranged to guide the pin into the leg under the respective pockets.

5. A gas valve comprising a valve body, a valve seat formed therein, a valve member arranged in the valve body to engage said seat, a coil on said valve body, a stem on said valve member forming a core for said coil, and a pin on said valve member extending into a cam slot formed in said valve body, said cam slot having two vertically arranged legs, a pocket above each leg, a fin between said pockets, a switch point below said pockets arranged to guide the pin into the leg under the respective pockets, and means in one leg of the cam slot to limit the downward movement of the pin therein.

6. A gas valve comprising a valve body, a valve seat formed therein, a valve member arranged in the valve body to engage said seat, a coil on said valve body, a stem on said valve member forming a core for said coil, and a pin on said valve member extending into a cam slot formed in said valve body, said cam slot having two vertically arranged legs, a pocket above each leg, a fin between said pockets, a switch point below said pockets arranged to guide the pin into the leg under the respective pockets, a latch elastically held in the path of the pin when in one leg of the cam slot, means for retracting the latch out of the path of the pin, and means in said last named leg to limit the downward movement of the pin therein.

In testimony whereof, I have hereunto set my hand at Los Angeles, California, this 23rd day of April, 1918.

JESSE A. MARTIN.